Feb. 21, 1967  F. COULMAN  3,304,616
SHRINK GAGE
Filed Jan. 27, 1965  3 Sheets-Sheet 1
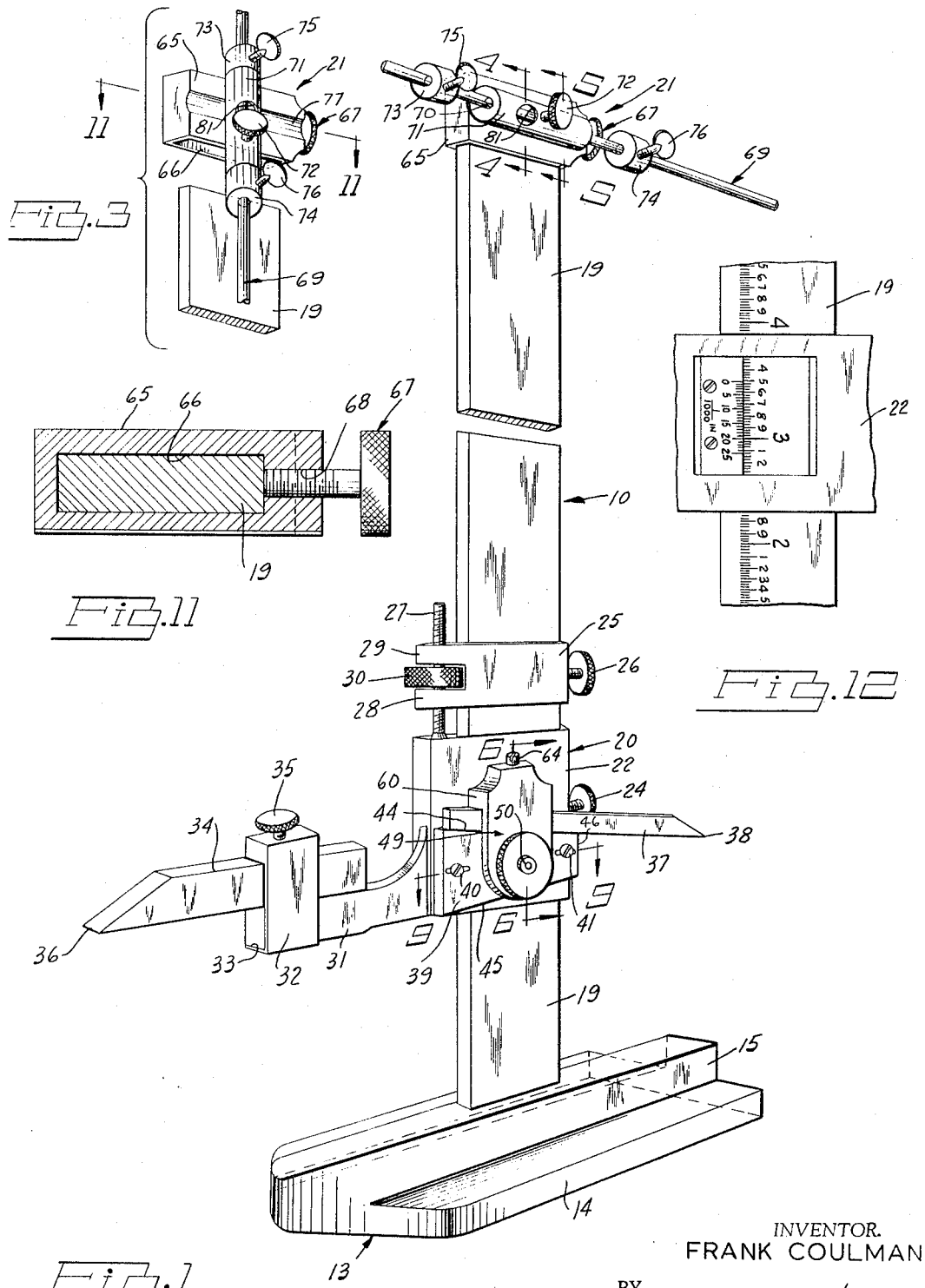
INVENTOR.
FRANK COULMAN
BY Donnelly, Mentag & Harrington
ATTORNEYS

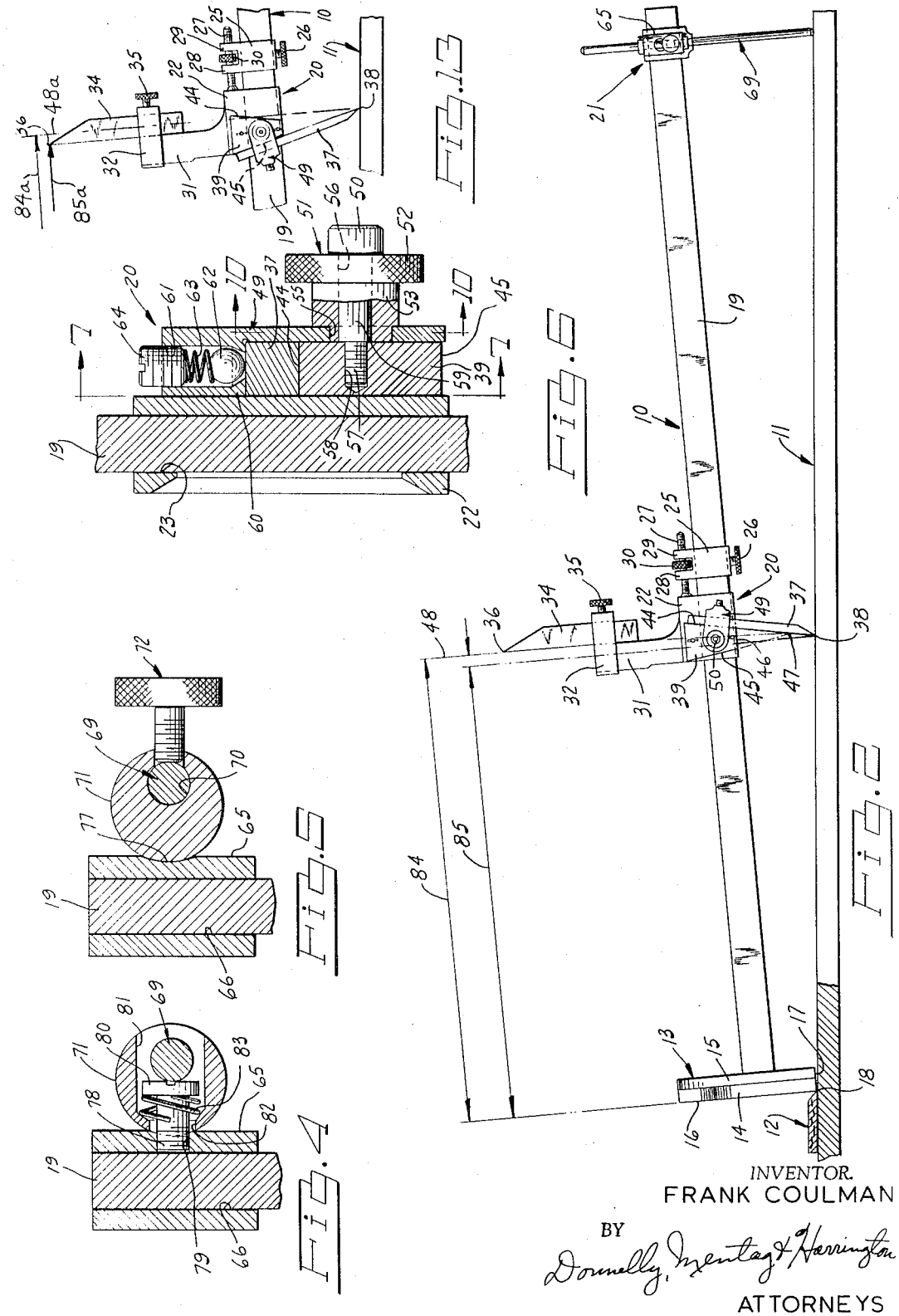

Feb. 21, 1967 F. COULMAN 3,304,616
SHRINK GAGE
Filed Jan. 27, 1965 3 Sheets-Sheet 3
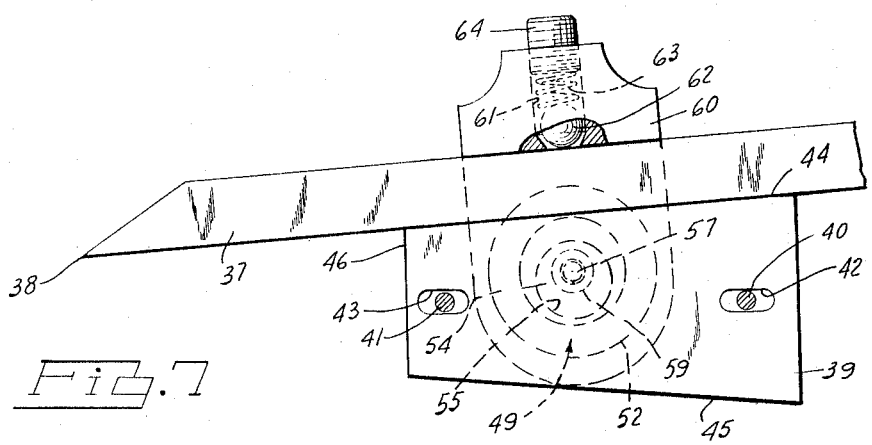
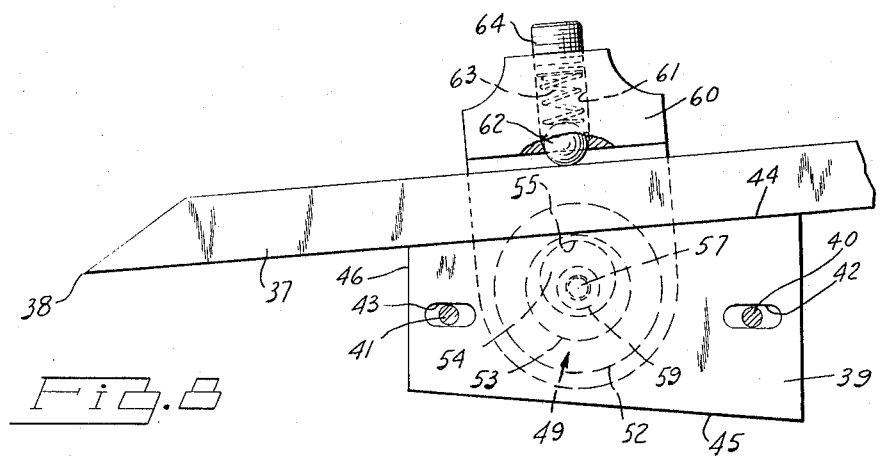
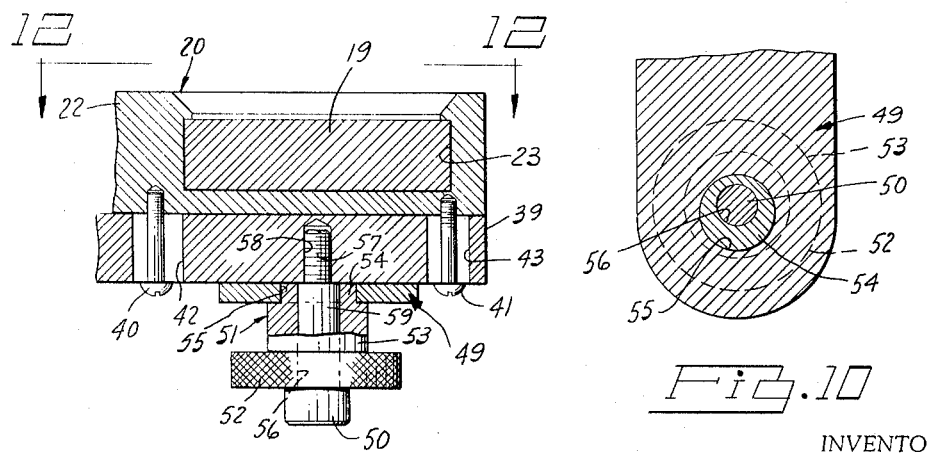
INVENTOR.
FRANK COULMAN
BY
Donnelly, Mentag & Harrington
ATTORNEYS

United States Patent Office 3,304,616
Patented Feb. 21, 1967

3,304,616
SHRINK GAGE
Frank Coulman, 30032 Cousino Drive,
Warren, Mich. 48092
Filed Jan. 27, 1965, Ser. No. 428,391
9 Claims. (Cl. 33—170)

This invention relates generally to the layout gage art, and more particularly to a shrink gage which is adapted to facilitate the taking, from drawings, die plates and the like, measurements which include allowances for shrinkage.

Heretofore, in the pattern making art many steps were required in order to take a dimension from a die plate, a layout drawing, or the like, and transfer the dimension, with a shrink allowance included, to a pattern. For example, many of these layout drawings are not dimensioned and the pattern maker must first use a rule to measure from a base line on the drawing to the desired point, and then a shrinkage allowance is added to the measurement, by the use of a shrinkage chart for the material being used to obtain the corresponding shrinkage allowance. The gage for transferring the measurement or dimension from the base line to the desired point is then set and the dimension with the shrinkage allowance included is scribed on the pattern. It will be seen from the foregoing that the prior art method of taking dimensions from layout drawings and transferring them to a pattern includes many time-consuming steps. Accordingly, it is an important object of the present invention to provide a novel shrink gage which is simple to use, and which is adapted to permit a pattern maker to quickly and easily pick up a dimension from a layout drawing and to apply the dimension, with the shrinkage allowance included, to a pattern without the need for any expensive shrink charts or shrink rules, and without the need for taking a dimensional reading by means of a rule from a layout drawing and then setting the gage in accordance with calculations to determine the required shrinkage allowance.

It is an important object of the present invention to provide a novel shrink gage which is adapted to pick up a dimension from a paper drawing with the shrinkage allowance automatically included, with an accuracy equal to the accuracy obtainable from the use of a die plate instead of a drawing. The shrink gage makes a paper drawing literally as accurate as a die plate since the shrink gage automatically accounts for any dimensional changes, such as shrinkage in the paper of the drawing due to atmospheric conditions.

It is another object of the present invention to provide a novel shrink gage which is simple and compact in construction, economical to manufacture, and efficient and accurate in operation.

It is a further object of the present invention to provide a novel shrink gage which can be used to take a dimension from a layout drawing and transfer the dimension directly onto a pattern with the shrink allowance automatically included in the transferred dimension.

It is still another object of the invention to provide a novel shrink gage which automatically adds the shrinkage allowance to a dimension taken from a layout drawing without the necessity of making any calculations for determining the shrinkage allowance.

It is a further object of the present invention to provide a novel shrink gage which is adapted for scribing dimensions which include shrinkage allowances, and which gage comprises an elongated post having a zero dimension reference means on one end thereof, support means adjustably mounted on said post for supporting the post in an inclined position relative to a drawing and the like, with the zero dimension reference means aligned with a base line on the drawing, and scribing means adjustably mounted on said post and including at least one scriber point and a dimension pickup member with the scriber point and dimension pickup member being adapted to be adjustably disposed relative to each other along the longitudinal axis of the post, so that when the dimension pickup member is disposed at a point on the drawing a predetermined dimension from said drawing base line, the scriber point will be disposed at a distance away from said drawing base line equal to the predetermined dimension plus a shrinkage allowance.

It is still a further object of the present invention to provide a novel shrink gage which includes an elongated post having a base member fixedly mounted on the lower end thereof; a first adaptor slidably mounted on said post and provided with a pair of adjustably mounted scriber points which are capable of being set at different longitudinal positions relative to each other on the post; and, a second adaptor slidably mounted on said post and having a transversely disposed support rod adjustably mounted thereon.

Other objects, features and advantages of this invention will be apparent from the following detailed description, appended claims, and the accompanying drawings:

In the drawings:

FIG. 1 is a broken, elevational perspective view of a shrink gage made in accordance with the principles of the present invention, and which illustrates the invention as applied to a height gage;

FIG. 2 is a side elevational view of the shrink gage of FIG. 1, showing the gage in an operative position on a die plate;

FIG. 3 is a fragmentary view of the upper end of the elongated post of the shrink gage, showing the supporting adaptor employed in the invention, and in a position removed from the post;

FIG. 4 is a fragmentary, enlarged, elevational sectional view of the structure illustrated in FIG. 1, taken along the line 4—4 thereof, and looking in the direction of the arrows;

FIG. 5 is a fragmentary, enlarged, elevational sectional view of the structure illustrated in FIG. 1, taken along the line 5—5 thereof, and looking in the direction of the arrows;

FIG. 6 is a fragmentary, enlarged, partial, elevational section view of the structure illustrated in FIG. 1, taken along the line 6—6 thereof, and looking in the direction of the arrows;

FIG. 7 is an elevational view, partly in section, of the structure illustrated in FIG. 6, taken along the line 7—7 thereof, and looking in the direction of the arrows;

FIG. 8 is a view similar to FIG. 7, but showing the cam means for holding the scriber point in place in an unlocked position;

FIG. 9 is a fragmentary, enlarged, horizontal sectional view of the structure illustrated in FIG. 1, taken along the line 9—9 thereof, and looking in the direction of the arrows;

FIG. 10 is a fragmentary, elevational sectional view of the structure illustrated in FIG. 6, taken along the line 10—10 thereof, and looking in the direction of the arrows;

FIG. 11 is an enlarged, horizontal sectional view of the structure illustrated in FIG. 3, taken along the line 11—11 thereof, and looking in the direction of the arrows;

FIG. 12 is a fragmentary, reduced, elevational view of the structure illustrated in FIG. 9, taken along the line 12—12 thereof, and looking in the direction of the arrow; and, FIG. 13 is a fragmentary, elevational view of the scriber support means of the invention, and showing the pick-up scriber in a position reversed to the position shown in FIG. 2.

Referring now to the drawings and in particular to FIG. 1, the numeral 10 generally designates a shrink gage made in accordance with the principles of the present invention. The illustrative embodiment is in the form of a height gage.

In FIG. 2, the height gage 10 is shown in an operative position on a conventional die plate 11. Although the gage 10 is shown as being used in FIG. 2 with a die plate, it will be understood that it may also be used with paper drawings and the like. The numeral 12 in FIG. 2 generally designates a rule or straight edge which is disposed along the base line of a drawing formed on the die plate 11.

As shown in FIGS. 1 and 2, the gage 10 includes a base, generally indicated by the numeral 13, which includes a flate plate-like portion 14 on which is centrally mounted an elevated portion 15. The base 13 is substantially rectangular in overall plan configuration, but is provided on the front end thereof with a rounded nose portion. As shown in FIG. 2, the lower side or bottom surface of the base 13 is indicated by the numeral 16 and it is flat and perpendicular to the vertical rear end surface 17. In use, the junction point between the surfaces 16 and 17 is disposed against the front edge 18 of the straight edge or beveled stop member 12, in alignment with a base line on a die plate or drawing.

As shown in FIGS. 1 and 2, the gage 10 further includes an elongated post 19 which is fixedly mounted at the lower end thereof to the central portion 15 of the base 13. The post 19 is disposed perpendicular to the bottom surface 16 of the base 13, and in the illustrative embodiment post 19 comprises an elongated rule having a rectangular cross section. Slidably mounted on the post 19 is a first adaptor or scribing means, generally indicated by the numeral 20, and a second adaptor or support means, generally indicated by the numeral 21. The second adaptor 21 is mounted on the upper end of the post 19 and is adapted to hold the post 19 in a predetermined position relative to the die plate 11 to permit the first adaptor 20 to be moved along the post 19 for taking dimensions from the die plate 11, as will be more fully explained hereinafter.

The first adaptor 20 is disposed below the second adaptor 21, and it may be termed the lower adaptor. As shown in FIGS. 1, 2, 6 and 9, the adaptor 20 comprises a slidably mounted body 22 which is formed as a slide block. In FIGS. 6 and 9, the slide block 22 is illustrated as provided with the longitudinally extended square hole 23 through which is slidably received the post 19. As shown in FIG. 1, the slide block 22 is provided with the set screw 24 which is threadably mounted through one of the side walls of the slide block 22 and engages the post 19 for locking the slide block 22 in an adjusted position on the post 19.

The first adaptor 20 is provided with a conventional fine adjustment means, as shown in FIGS. 1 and 2. The fine adjustment means comprises the slidably mounted body or slide block 25 which is substantially rectangular in shape and which is provided with a suitable hole (not shown) through which is slidably received the post 19 in the usual manner of a fine adjustment means of a conventional height gage. The slide block 25 of the fine adjustment means is provided with a pair of outwardly extended, spaced apart arms 28 and 29 between which is disposed a knurled, round adjusting nut 30. An adjusting screw 27 has its lower end fixedly mounted to the upper end of the slide block 22, and its upper end passes upwardly through suitable holes in the arms 28 and 29 and through a threaded hole in the adjusting nut 30. The slide block 25 is adapted to be secured in a releasable manner to the post 19 by means of the set screw 26 which is threadably mounted through one of the walls of the slide block 25 so as to engage the post 19.

It will be understood that the structure of the slide blocks 22 and 25 and the means for securing these blocks on the post 19 may be of the type used on conventional height gages. It will be seen that the releasing of the set screws 24 and 26 (FIG. 1) permits the first adaptor or scribing means 20 to be moved to an approximate position on the post 19, and in which position the set screw 26 would be operated to lock the slide block 25 in place on the post 19. The slide block 22 may then be adjusted to the exact desired position on the post 19 by means of the adjusting nut 30. After the slide block 22 has been moved to the desired position it is held in place on the post 19 by means of the set screw 24.

As shown in FIGS. 1 and 2, a support member or arm 31 is extended outwardly from the slide block 22 in a direction perpendicular to the post 19. The support arm 31 is integrally connected at the inner end thereof to the slide block 22, and the outer end thereof is substantially square and is adapted to be received in the rectangular recess 33 formed in the side of the clamp 32. As shown in FIG. 1, a scriber point 34 is mounted in the recess 33 on top of the outer end of the support arm 31, and it is held in place in the recess 33 by the thumb screw 35. The outer end of the scriber point 34 is provided with the scribing edge 36.

As best seen in FIGS. 1 and 2, the first adaptor or scribing means 20 is provided with a second scriber point 37 which is provided with the scribing edge 38. The scriber point 37 is adjustably mounted on the slide block 22 by the following described structure. Adjustably mounted on one side of the slide block 22 is a carrier plate 39 which is adjustably secured to the slide block 22 by any suitable means, as the screws 40 and 41. As best seen in FIGS. 7 and 8, the screws 40 and 41 pass through the elongated slots 42 and 43, respectively, formed in the plate 39 and into threaded engagement with suitable threaded holes in the slide block 22. It will be seen that the slots 42 and 43 permit the plate 39 to be adjusted endwise relative to the slide block 22, as desired.

As shown in FIGS. 1 and 2, the carrier plate 39 is provided with upper and lower converging mounting surfaces 44 and 45, respectively. The scriber point 37 is shown as being seated on the upper mounting surface 44. As shown in FIGS. 1, 2, 7 and 8, the front end 46 of the plate 39 is cut off and is substantially parallel with the longitudinal axis of the post 19. As illustrated in FIG. 2, it will be seen that if the converging or sloping mounting surfaces 44 and 45 were continued sideward outwardly in the direction of the extension of the scriber point 37 that they would terminate at the juncture point or imaginary point in space indicated by the numeral 47. As shown in FIG. 2, the imaginary point 47 is disposed on the lower surface or plane of the scriber point 37, and it is the terminal point of the illustrative scribing line indicated by the numeral 48. The scribing line 48 passes along the lower surface or plane of the bottom of the scriber point 34. The converging mounting surfaces 44 and 45 of the plate 39 may be disposed at any suitable acute angle relative to each other and to the longitudinal axis of the post 19. It has been found that an included angle 18° between the surfaces 44 and 45 is a preferable angle. That is, the mounting surfaces 44 and 45 extend upwardly, as viewed in FIG. 2, from the junction point 47 in a direction of 9° on opposite sides of the illustrative scribing line 48. It will be seen, that in FIG. 2, the scriber point 37 is disposed on the mounting surface 44 which slopes toward the die plate base line, and that the scribing edge 38 is positioned below the scribing line 48.

The scriber point 37 is releasably secured on the carrier plate 39 by the following described structure. As shown in FIGS. 1 and 9, a plate 49 is swingably mounted on the outer side of the carrier plate 39 by means of the screw 50 and the eccentric cam mounting and clamping means (FIG. 9) generally indicated by the numeral 51. As best seen in FIG. 9, the eccentric cam mounting member 51 is provided with a knurled thumb wheel or knob 52 and a concentric shaft 53. Integrally formed on the inner end of the shaft 53 is an eccentric shaft extension 54 which is rotatably mounted in the hole 55 formed through the plate 49. The eccentric cam mounting and clamping means 51 is provided with an axial hole 56 through which is mounted the screw 50. The screw 50 has an inner threaded end 57 which is threadably mounted in the threaded hole 58 in the plate 39. The screw 50 is further provided with the journal portion 59 on which is rotatably mounted the eccentric cam mounting and clamping means 51.

As best seen in FIGS. 1, 7 and 8, the plate 39 is provided with a sidewardly inward extended integral portion 60 which extends over the upper side of the scriber point or dimension pick-up member 37. As best seen in FIGS. 7 and 8, a hole 61 is formed in the plate extension 60 in a direction perpendicular to the upper mounting surface 44 of the scriber point 37 and in alignment with the screw 50. A ball bearing 62 is mounted in the lower end of the hole 61 and it is biased or moved toward the scriber point 37 by means of a coil spring 63 which is secured in the hole 61 by means of the adjustable screw 64. It will be seen that by adjusting the screw 64 inwardly and outwardly in the hole 61, that the spring tension on the ball 62 may be increased or decreased accordingly, as desired.

The last described structure for clamping the scriber point 37 on the plate 39 comprises a locking attachment which functions through a cam locking action and a ball bearing friction holding action. When the clamping means knob 52 is rotated to the position shown in FIG. 8, the plate 39 will be moved upwardly to release the locking action on the scriber point 37, and the scriber point 37 may be quickly and easily removed from its position on the mounting surface 44. When the scriber point 37 is replaced or put back on the surface 44 on the plate 39, it may be adjusted axially or longitudinally to a desired position and then clamped in such position by rotating the knob 52 so as to turn the eccentric member 54 through an angular distance of 180° to the position shown in FIG. 7, which action moves the clamping plate 39 downwardly and brings the lower side of the plate inward extension 60 into locking engagement with the upper side of the scriber point 37. It will be seen that the lower end of the hole 61 is slightly enclosed around the edges thereof so as to permit the ball 62 to slightly emerge from the hole 61 and contact the scriber point 37, and yet retain the ball 62 in the hole 61 when the scriber point 37 is removed from the clamping structure. When the clamping structure is in the unlocked position shown in FIG. 8, the spring biased ball 62 maintains a pressure on the scriber point 37 so that it will not fall out of the clamping structure accidentally, but yet permit endwise adjustment of the scriber point 37. In FIG. 6, the last described scriber point or dimension pick-up member clamping structure is shown in the locked position.

The second adaptor or support means 21 comprises a slidably mounted body or slide block 65 which is best seen in FIGS. 1 and 3. The slide block 65 is substantially rectangular in overall configuration and is provided with a square hole 66 therethrough in which is slidably received the upper end of the post 19. As shown in FIG. 11, the slide block 65 is adapted to be locked in position on the post 19 by means of a thumb screw generally indicated by the numeral 67. The thumb screw 67 is threadably mounted in the hole 68 in the slide block 65, and the inner end thereof engages the side of the post 19 and locks the slide block 65 on the post 19 when the screw 67 is threaded inwardly.

As shown in FIGS. 1, 2 and 3, the second adaptor 21 is adapted to carry the gage rod, generally indicated by the numeral 69. The gage rod 69 is circular in cross section and may be made from any suitable material, as for example, drill rod. As best seen in FIGS. 1 and 5, the gage rod 69 is slidably mounted in the longitudinally extended hole 70 formed in the elongated circular carrier member 71. The gage rod 69 is adapted to be locked in an adjusted position in the carrier member 71 by any suitable means, as by the thumb screw 72.

As best seen in FIGS. 1 and 2, the gage rod 69 is provided with a pair of circular stop members 73 and 74 which are slidably mounted on the rod 69 and adapted to be secured in adjusted positions thereon by means of the thumb screws 75 and 76, respectively. The stop members 73 and 74 permit the gage rod 69 to be set at a predetermined position relative to the post 19 and to retain that setting even though one stop member is removed to permit the gage rod 69 to be removed from the body 71. The gage rod 69 may then be quickly and easily repositioned in the body 71 by means of the one stop member that was not moved from its set position. The stop members 73 and 74 permit a number of gage rods to be set up for different materials and different shrinkage allowances for use when they are needed.

The gage rod carrier body 71 is adjustably mounted on the slide block 65 to permit the gage rod 69 to be moved from a position perpendicular to the longitudinal axis of post 19, as shown in FIG. 2, to the position shown in FIG. 3 wherein it is disposed parallel to the longitudinal axis of the post 19. As best seen in FIGS. 3, 4 and 5, the slide block 65 is provided on one side thereof with a concave recess 77, which extends transversely to the longitudinal axis of the post 19, on the outer face of one of the side walls. The carrier body 71 is in an operative position when it is disposed in the concave groove 77, as shown in FIG. 1. The carrier body 71 is pivotally mounted on the slide block 65 by means of the screw 78 which is threadably mounted in the threaded hole 79 formed in the slide block 65 in the bottom of the concave groove 77, as shown in FIG. 4. The screw 78 is provided with an enlarged head 80 which is disposed in the transverse hole 81 in the carrier body 71. The carrier body 71 is provided with a hole 82 which communicates with the enlarged hole 81 and through which the screw 78 extends into the threaded hole 79 in the slide block 65. A coil spring 83 is mounted between the inner end of the hole 81 and the screw head 80 to provide a spring tension on the carrier body 71 and bias it into an operative seating engagement in the concave groove 77. It will be seen that the gage rod carrier body 71 may be quickly and easily swung from the operative position shown in FIG. 1 to the inoperative position shown in FIG. 3.

The use of the shrink gage of the present invention may be illustrated by referring to FIG. 2 and describing the set up procedure and use when the die plate or drawing is not dimensioned and when it is dimensioned. Assuming that the die plate 11 is not dimensioned, the straight edge 12 would first be disposed along the base line on the die plate 11. The first adaptor or scribing means 20 is then adjusted to a zero or initial reading by means of any suitable gage blocks or rule to determine the basic position of the gage rod 69 in the following described manner. The shrink gage would be disposed on a suitable tool, such as a surface plate or the like, and the adaptor 20 would be moved along the post 19 until the scriber point 34 has its scribing edge 36 disposed at a height above the reference plane equal to a basic dimension of, for example, three inches plus the known shrinkage of the particular material involved for the zero dimension of three inches. The basic dimension would be indicated in FIG. 2 by line 84. When the approximate dimension 84 is reached, the slide block 25 is locked on the post 19 by the thumb screw 26. The scribing edge 36 of the scriber point 34 is then adjusted to the desired final dimension of three inches plus the shrinkage allowance for three inches for the particular material involved, by means of the fine adjustment knob 30 which moves the slide block 22 to the desired position. The slide block 22 is then locked in place on the post 19 by means of the thumb screw 24. The scriber point 37 is then set by means of the gage blocks so that the scribing edge 38 is exactly three inches above the lower surface 16 of the base 13, as indicated by the line 85 in FIG. 2. The scriber point 37 would first be unclamped by operating the aforedescribed cam locking structure comprising the members 50 through 59, as described hereinbefore in reference to FIGS. 6 through 8. When the scribing edge 38 has been positioned on the initial reading of three inches, the scriber point 37 is locked in position on the mounting surface 44 on the plate 39. The shrink gage is then positioned as shown in FIG. 2, with the bottom end surface 16 of the base 13, or zero dimension reference means, against the straight edge 18 of the rule 12. The scribing edge 38 will rest against the die plate 11, and the gage rod 69 is then positioned in the carrier block 71 and locked in position with its lower end engaging the die plate 11. The stop 74 is then moved along the rod 69 until it engages the lower side of the carrier body 71 and is then locked in that position by means of the thumb screw 76. The thumb screw 72 is used to lock the gage rod 69 relative to the carrier body 71.

It will be seen, that the first adaptor 20 may then be released and moved up and down the post 19, and the second adaptor 21 will be held in the same relative position over the die plate 11, as was determined by the initial setting of the first adaptor 20 on the post 19. The post 19 is thus positioned over the die plate 11 in a sloping or angular position relative thereto, and in proportion to the shrinkage factor of the particular material of the pattern which is being worked on. If the die plate 11 is not dimensioned, the various measurements for the pattern can be quickly and easily taken from the die plate 11 by simply sliding the first adaptor 20 upwardly and downwardly on the post 19 and bringing the scribing edge 38 of scriber point 37 into engagement with the die plate 11 at the point where a dimension is to be taken relative to the base line along the straight edge 18 of the rule 12. It will be seen that the scriber point 37 can be quickly unlocked relative to the plate 39 to permit the scriber point 37 to be slid upwardly and downwardly on the sloping or tapering mounting surface 44 so as to bring the scribing edge 38 into engagement with the die plate 11 at the desired point. It will be seen that for any position along the post 19, the scriber point 34 is automatically moved to the proper position relative to the bottom surface 16 of the base 13, and the shrinkage allowance for the dimension picked off of the die plate 11 by the scriber point 37 is automatically included in the setting of the scriber point 34. After each setting the pattern maker may lift the gage up and quickly scribe the desired dimension, with the shrinkage allowance included, on the pattern by means of the scribing edge 36.

The advantages of the shrink gage of the present invention can be more fully seen when the shrink gage is used to take dimensions from a paper drawing. The shrink gage of the present invention, for all practical purposes, converts a paper drawing into an accurate die plate. The change in dimensions of a die plate due to changes in temperature and other atmospheric conditions is substantially non-existent for all practical purposes. Die plates are normally made from enameled sheet aluminum and have very stable measurement characteristics. Paper drawings, on the other hand, have unstable measurement characteristics, and they may shrink or be enlarged, due to changes in atmospheric conditions, from the condition existing when the drawing was made. The shrink gage of the present invention automatically eliminates errors in the dimensions in paper drawings due to the paper being stretched or shrunk.

Paper drawings are either provided with dimensions or with equally spaced apart grid lines. Normally, grid lines are a plurality of lines drawn perpendicularly to each other so as to provide squares of certain dimensions, as for example, 5" squares. In such a case, the grid lines in each of the perpendicularly disposed sets of lines would be 5" apart. In using the shrink gage of the present invention with paper drawings which are dimensioned or which are provided with grid lines, the operator first selects one of the grid lines, or dimensioned lines, on the drawing for a base line and then works from this base line to pick up all of the dimensions necessary in the making of a pattern from the drawing. A straight edge, or the like, as for example, a straight template made out of transparent plastic, is then mounted on the drawing along the base line in the same manner as the rule 12 shown in FIG. 2.

In order to set up the gage rod 69, the scriber point 34 is set at a predetermined dimension above the base surface or zero dimension reference means 16 in the same manner as described hereinbefore, by the use of gage blocks or a rule. The shrink gage is then disposed over the drawing in the same manner as shown in FIG. 2 for its disposition over the die plate 11 and with the bottom surface 16 of the base 13 along the selected base line on the drawing. The scriber point 37 is then unclamped and is moved, either up or down, until the scribing edge 38 engages the corresponding grid line or dimension line on the drawing. For example, if the scriber point 34 has been set to a dimension of 5" plus the shrinkage allowance for 5" for the material being used, the scriber edge 38 of the scriber point 37 would be moved until it is aligned with the 5" grid line, or the 5" point above the base line on a dimensioned drawing. The scriber point 37 is then locked in position to maintain the post 19 in the sloping position over the drawing as determined by the setting of the scriber point 37. The gage rod 69 is then adjusted downwardly relative to its carrier 71 until it engages the drawing. After the gage rod 69 has been positioned against the drawing it is locked in place and the scribing means 20 is then free to be moved up and down the post 19 to pick up other dimensions from the drawing. Additional dimensions may then be taken off the drawing with the shrinkage allowance automatically included. For example, if the drawing is not dimensioned, but is provided with 5" grid lines, the scribing edge 38 of the scriber point 37 may be moved to any desired point on the drawing, even to points between the grid lines, and secured in place and the corresponding setting of the scriber point 34 will be the exact dimension from the base line with the shrinkage allowance included. Any shrinkage or stretching of the paper drawing is automatically accounted for in the original setting and the paper drawing has thus been converted into a drawing which is as accurate as a die plate for all practical purposes.

Heretofore, industry has made photographs of paper drawings and has blown them up and made the photographs on a plastic called Mylar. The size of the drawing is enlarged or blown up to include an allowance for shrinkage. The making of Mylar drawings has been one attempt to overcome the problem of adding a shrinkage allowance to the dimensions of a paper drawing. However, even when the procedure of making drawings to an enlarged condition on Mylar is practiced, it is still necessary to bring the atmospheric conditions back to the condition existing when the Mylar photograph was made so as to produce an accurate reading of the dimensions on the drawing. It will be seen that the shrink gage of the present invention eliminates all the expense of making such photographic Mylar drawings since a pattern maker can pick off the dimensions directly from the paper drawings without having to worry about dimensional changes in the paper drawings themselves. A further disadvantage of the Mylar drawings is that the lines are blown up and made bigger when the paper drawings is enlarged, and consequently, the resultant dimensions taken from such Mylar drawings are not as accurate as when the dimensions are taken directly off the paper drawings with the shrink gage of the present invention.

It will be understood that the scriber point 37 does not have to be a scriber point when used for carrying out the aforedescribed dimension pickup operations. The device used to carry out the function of the scriber point 37 may be any suitable dimension pickup means, as for example, any member having a pointed or sharp edge thereon.

It also will be seen that although the lower surface 16 of the base 13 has been used as the zero reference means to be disposed along the base line, that the shrink gage of the present invention could be provided without a base and the lower end of the post itself could have a surface perpendicular to the one side of the post and comprise a zero dimension reference means which would be disposed along the reference base line on a die plate or on a drawing.

It also will be seen that the shrink gage of the present invention works on a direct proportion relationship between the shrink allowance for a particular material and the desired dimension to be picked off a drawing or die plate. Since the shrink allowance for each material is consistent and it is merely additive in a direct proportionate relationship as a dimension becomes larger, the angular relationship of the post 19 relative to a horizontal base may be determined for one dimension and the angular relationship will be constant and the same for all other dimensions to be picked from the drawing.

The shrink gage of the present invention may also be used to scribe dimensions onto a pattern with the shrinkage allowance added, without the need for taking the dimensions from a drawing or die plate, but when the dimensions are known. The setting of the gage rod 69 would be carried out for any particular material in the aforedescribed manner. The post 19, when formed from a conventional height gage with the scale or rule marking as shown in FIG. 12 and the vernier adjustment means, can be used to set up a dimension on the scriber point 34, and the same dimension with shrinkage allowance added can be scribed onto a pattern with the scriber point 37 by disposing the scriber point 37 on the lower mounting surface 45, as shown in FIG. 13.

The clamping plate 49 and its associated structure is rotated about the outer end of the plate 39 to a position below the plate, as shown in FIG. 13, where it may be used to clamp the scriber point 37 on the lower mounting surface 45. The scribing edge 38 is thus positioned above the imaginary scribing line 48 as shown in FIG. 2 for the use of the scriber 37 when it is mounted on the surface 44, and instead the scriber 37 is positioned at the imaginary scribing line 48a. The shrink gage is thus set up for setting dimensions with the vernier adjustment means of the height gage and the scriber point 34, and the dimension line 85a in FIG. 13 would be the actual dimension of the position of the scriber edge 36 above the zero dimension reference of the shrink gage. The scribing edge 38 of the inverted scriber point 37 may then be disposed in the following manner at a distance indicated by the numeral 84a above the zero dimension reference, and this distance would automatically include a shrinkage allowance for the corresponding setting to which the scriber point 34 was set. The scribing edge 38 of the scriber point 37 would be quickly disposed at the proper distance 84a from the gage zero dimension reference by disposing the gage in the angular position shown in FIG. 2 over a die plate with the gage rod 69 supporting the post in the proper angular position for the particular material involved. The scriber point 37 would then be unclamped and moved upwardly or downwardly on the mounting surface 45 to permit it to engage the die plate. When the scribing edge 38 engages the die plate the scriber point 37 is locked in place, and the scribing edge 38 will be at the proper position relative to the zero dimension reference to permit it to be used to scribe the dimension 85a plus the shrinkage allowance on a pattern. Other dimensions may be set by means of the scale on the post 19 and the vernier adjustment means of the first adaptor 20, and the same dimensions with the shrinkage allowances may be quickly determined by setting the scriber point 37 in the aforedescribed manner and then using the scriber point 37 to scribe the dimensions onto a pattern.

It will be seen that the shrink gage of the present invention is a versatile and advantageous tool for a pattern maker or for any mechanic working in an art where shrinkage must be considered in transferring dimensions from drawings or the like to a workpiece such as a pattern. The shrink gage of the present invention eliminates the need for the many shrink rules which a pattern maker normally must have available in order to carry out his work. A pattern maker normally must have a shrinkage rule for a $\frac{1}{16}''$ shrinkage allowance, a $\frac{1}{8}''$ shrinkage allowance, a $\frac{1}{4}''$ shrinkage allowance, $\frac{3}{16}''$ shrinkage allowance and so forth. These rules are expensive and require space and special boxes for storing the same. Furthermore, a pattern maker usually has many charts for converting readings to include a shrinkage factor. The shrink gage of the present invention eliminates the need for these shrinkage rules and charts since the basic unit shrinkage for any particular material on which the pattern maker may be working is all that is needed to be known in order to use the shrink gage of the present invention.

The stop members 73 and 74 permit the quick and easy substitution of different gage rods 69 in the carrier body 71. The pattern maker may set one of the stops 73 or 74 on a particular gage rod 69 and maintain it in a position on the gage rod for a particular material being worked on. The pattern maker may thus save much time by quickly and easily substituting a desired gage rod 69 with the stop 73 or 74 fixed in the proper position to provide the desired elevation of the post 19 above a drawing or die plate 11 in accordance with the job being worked on.

As described hereinbefore, the carrier body 71 may be moved from the position of FIG. 1 to the position of FIG. 3. It will be seen that by swinging the carrier body 71 to the position shown in 73 that the pattern maker may move the shrink gage to a scribing position relative to a pattern without the danger of hitting the gage rod 69 against the pattern. With the gage rod 69 in the position shown in FIG. 1, it may not be possible in some instances to bring the scriber point 37 in engagement with a pattern if the shrink gage is being so used that the scribing point 37 is to be used to scribe a line on the pattern.

While it will be apparent that the preferred embodiment of the invention herein disclosed is well calculated to fulfill the objects above stated, it will be appreciated that the invention is susceptible to modification, variation and change without departing from the proper scope or fair meaning of the subjoined claims.

What I claim is:

1. A shrink gage for scribing dimensions with shrinkage allowances included, comprising:
    (a) an elongated post having a zero dimension reference means on one end thereof;
    (b) support means adjustably mounted on said post for supporting the post in an inclined position relative to a drawing and the like, with the zero dimension reference means aligned with a base line on the drawing; and,
    (c) scribing means adjustably mounted on said post and including at least one scriber point outwardly extended from the post in one direction and a dimension pickup member extended outwardly from the post in the opposite direction, with the scriber point and dimension pickup member being adapted to be adjustably disposed relative to each other along the longitudinal axis of the post so that when the dimension pickup member is disposed at a point on the drawing at a predetermined dimension from said drawing base line, the scriber point will be disposed at a distance away from the base line equal to the predetermined dimension plus a shrinkage allowance.

2. A shrink gage as defined in claim 1, wherein:
(a) said scriber point is disposed for adjustment perpendicular to the longitudinal axis of the post; and,
(b) said dimension pickup member is disposed for adjustment along a line at an acute angle relative to the longitudinal axis of the post.

3. A shrink gage as defined in claim 2, wherein:
(a) said dimension pickup member comprises a second scriber point.

4. A shrink gage for scribing dimensions with shrinkage allowances, included, comprising:
(a) an elongated post having a zero dimension reference means on one end thereof;
(b) support means adjustably mounted on said post for supporting the post in an inclined position relative to a drawing and the like, with the zero dimension reference means aligned with a base line on the drawing;
(c) scribing means adjustably mounted on said post and including at least one scriber point and a dimension pickup member with the scriber point and dimension pickup member being adapted to be adjustably disposed relative to each other along the longitudinal axis of the post so that when the dimension pickup member is disposed at a point on the drawing at a predetermined dimension from said drawing base line, the scriber point will be disposed at a distance away from the base line equal to the predetermined dimension plus a shrinkage allowance; and,
(d) said support means comprising,
(1) a body slidably mounted on said post; and,
(2) a rod adjustably mounted on said body and having one end extended sidewardly outward from the longitudinal axis of the post for engagement with the drawing for supporting the post in said inclined position.

5. A shrink gage as defined in claim 4, wherein:
(a) said rod is mounted on a carrier member and is axially adjustable relative to said carrier member; and,
(b) said carrier member is pivotally mounted on said slidably mounted body.

6. A shrink gage for scribing dimensions with shrinkage allowances included, comprising:
(a) an elongated post having a zero dimension reference means on one end thereof;
(b) support means adjustably mounted on said post for supporting the post in an inclined position relative to a drawing and the like, with the zero dimension reference means aligned with a base line on the drawing;
(c) scribing means adjustably mounted on said post and including at least one scriber point and a dimension pickup member is disposed at a point on dimension pickup member being adapted to be adjustably disposed relative to each other along the longitudinal axis of the post so that when the dimension pickup member on said mounting surface. the drawing at a predetermined dimension from said drawing base line, the scriber point will be disposed at a distance away from the base line equal to the predetermined dimension plus a shrinkage allowance; and,
(d) said scribing means comprising,
(1) a body slidably mounted on said post;
(2) a support arm on said body;
(3) said one scribed point being mounted on the support arm on one side of said post and adjustably perpendicularly outward and inward relative to said post; and,
(4) said dimension pickup member being mounted on the opposite side of said post and adjustable outwardly and inwardly relative to said post along a line at an acute angle relative to the longitudinal axis of the post.

7. A shrink gage as defined in claim 6, wherein:
(a) said body is provided with a mounting surface which is disposed at an acute angle relative to the longitudinal axis of the post for supporting said dimension pickup member for inward and outward movements relative to the longitudinal axis of the post; and,
(b) clamping means for releasably locking said dimension pickup member with the scriber point and 8. A shrink gage as defined in claim 7, wherein:
(a) said clamping means includes a cam actuated clamping member; and,
(b) a spring biased ball bearing means for maintaining a friction holding pressure on said dimension pickup member when the clamp locking action is released.

9. A shrink gage as defined in claim 6, wherein:
(a) said post is provided with calibrated rule markings; and,
(b) said body is slidably mounted on said post and is provided with a vernier adjustment means for setting the body relative to the post in accordance with said rule markings.

References Cited by the Examiner

UNITED STATES PATENTS

| 71,843 | 12/1867 | Bennor | 33—169 |
| 503,528 | 8/1893 | Cowley | 33—111 |
| 1,103,265 | 7/1914 | Corff. | |
| 2,791,034 | 5/1957 | Handy | 33—166 |

FOREIGN PATENTS 840,602  6/1952  Germany.

LEONARD FORMAN, *Primary Examiner.*

W. K. QUARLES, JR., *Assistant Examiner.*